US005136144A

United States Patent [19]

Swinton et al.

[11] Patent Number: 5,136,144

[45] Date of Patent: Aug. 4, 1992

[54] DEPOSITORY APPARATUS FOR ENVELOPES AND SINGLE SHEETS

[75] Inventors: James D. Swinton; Gordon Burke, both of Dundee, Scotland

[73] Assignee: NCR Corporation, Dayton, Ohio

[21] Appl. No.: 520,009

[22] Filed: May 7, 1990

[30] Foreign Application Priority Data

Dec. 1, 1989 [GB] United Kingdom ................. 8927225

[51] Int. Cl.[5] ..................... G06F 15/30; G06K 13/063; G06K 13/067; G06K 13/24

[52] U.S. Cl. .................................... 235/379; 235/475; 235/485; 271/227; 271/250

[58] Field of Search ............... 235/379, 475, 480, 485; 902/7, 9, 13; 271/3, 180, 236, 246, 250, 227, 273; 209/569

[56] References Cited

U.S. PATENT DOCUMENTS 3,873,443 3/1975 Cothran et al. .................. 209/111.7
3,988,571 10/1976 Blair et al. ........................... 235/379
4,196,846 4/1980 Kao et al. ............................ 235/475
4,391,510 7/1983 Cherian ............................ 355/3 S H
4,558,373 12/1985 Plasencia et al. .................... 358/285
4,618,302 10/1986 Kokubo et al. ........................ 414/33
4,696,426 9/1987 Decker et al. ...................... 232/43.1
4,817,934 4/1989 McCormick et al. .............. 271/296
4,820,909 4/1989 Kawauchi et al. .................. 235/379
4,822,018 4/1989 Hain ........................................ 271/3
4,838,480 6/1989 Takahashi et al. ................. 232/43.3
4,944,504 7/1990 Yamada et al. ..................... 271/171
4,997,176 3/1991 Hain ...................................... 271/180

OTHER PUBLICATIONS

IBM Technical Disclosure Bulletin, "Card Registration Device" by D. J. Wanek, vol. 13, No. 8, Jan. 1971 p. 2228.

*Primary Examiner*—John W. Shepperd
*Assistant Examiner*—Michael C. Kessell
*Attorney, Agent, or Firm*—Elmer Wargo

[57] ABSTRACT

A depository apparatus includes a common entry slot (14) for receiving both envelopes and single sheets, such as checks and a thickness sensor (216) for providing an output indicative of whether a deposit item is an envelope or a sheet. Transport apparatus (38) transports deposit items along a common feed path to a printer (42) for printing data on envelopes and sheets, and to a read head (40) for reading data from sheets. A sheet alignment mechanism is included in the common feed path and is operable to bring about alignment of a sheet relative to the read head (40) by moving the sheet into engagement with a reference member (170). Operation of the transport apparatus (38) is interrupted during operation of the alignment mechanism. Envelopes are fed directly into a first container (146). After reading of data from a sheet, operation of the transport apparatus (38) is reversed to feed the sheet into a selected one of two additional containers (138, 140).

11 Claims, 7 Drawing Sheets

DEPOSITORY APPARATUS FOR ENVELOPES AND SINGLE SHEETS

BACKGROUND OF THE INVENTION

This invention relates to a depository apparatus. The invention is concerned in particular with a depository apparatus for receiving deposit items comprising single sheets and deposits contained within envelopes.

The invention has application, for example, to a depository apparatus included in an automated teller machine (ATM) of the kind which is arranged to carry out a financial transaction, such as dispensing currency notes or accepting a deposit of money, as may be required by a customer. As is well known, in operation of an ATM of this kind, a user inserts a customer identifying card into the machine and then enters certain data (such as a personal identification number, type of transaction, and quantity of money required or to be paid in) on one or more keyboards included in a user console of the machine. The machine will then process the transaction, dispense currency notes or accept a money deposit as may be requested, and return the card to the user as part of a routine operation. If money is to be deposited, the user typically inserts an envelope containing the money (cash and/or checks) through a deposit entry slot in the user console, and the depository apparatus of the ATM transports the envelope to, and deposits it in, a container included in the apparatus. In addition, the ATM may have the facility for accepting single sheet items such as checks or payment slips, and the ATM may have a separate depository, including a separate entry slot for accepting such single sheet items.

Known depository apparatuses for accepting envelopes and single sheet items are arranged to print information such as a sequence number, time of deposit and audit information on the deposit items. Also, such known depository apparatuses include reading means for reading characters, such as magnetic ink or optical characters, carried on each sheet item. Such a depository apparatus also includes an alignment mechanism for ensuring that each sheet item is correctly aligned in relation to the reading means in order to permit the characters on the sheet item to be recognized.

From U.S. Pat. No. 4,696,426, there is known a depository apparatus including a common entry slot for receiving both envelopes containing deposits and single sheet items such as checks, the apparatus including thickness sensing means for providing an output indicative of whether a deposit item is an envelope or a sheet. The apparatus includes transport means for feeding deposit items to a common depository cartridge in which both envelopes and single sheet items are deposited. If the thickness sensing means indicates that a deposit item is a sheet, then the deposit item is diverted to the input end of a separate read transport mechanism which transports the item along a separate read path. Alignment and read operations in respect of a sheet take place while the sheet is being fed along the separate read path and, if necessary, the sheet is passed several times along the read path in order to achieve correct alignment. This known apparatus has the disadvantage that the provision of a separate read transport mechanism takes up space and adds to the complexity of the apparatus.

SUMMARY OF THE INVENTION

It is an object of the invention to provide a depository apparatus including a common entry aperture for receiving both envelopes and single sheet items, in which the above-mentioned disadvantage is alleviated.

According to the invention there is provided a depository apparatus including a common entry aperture for receiving both envelopes and sheets, and thickness sensing means for providing an output indicative of whether a deposit item received by said depository through said entry aperture is an envelope or a sheet, characterized by transport means for transporting deposit items from said entry aperture along a common feed path to print means for printing data on deposit items and to read means for reading data from deposit items which are sheets, sheet alignment means located in said common feed path and operable to bring about alignment of deposit items which are sheets in relation to said read means, and control means responsive to the output of said sensing means for controlling the operation of said transport means and said alignment means such that, prior to a deposit item which is a sheet reaching said read means, said alignment means is operated to move this item into engagement with reference means while the operation of said transport means is interrupted.

A preferred embodiment of this invention will now be described by way of example with reference to the accompanying drawing, description, and claims.

DESCRIPTION OF THE PREFERRED EMBODIMENT

Figure 1:
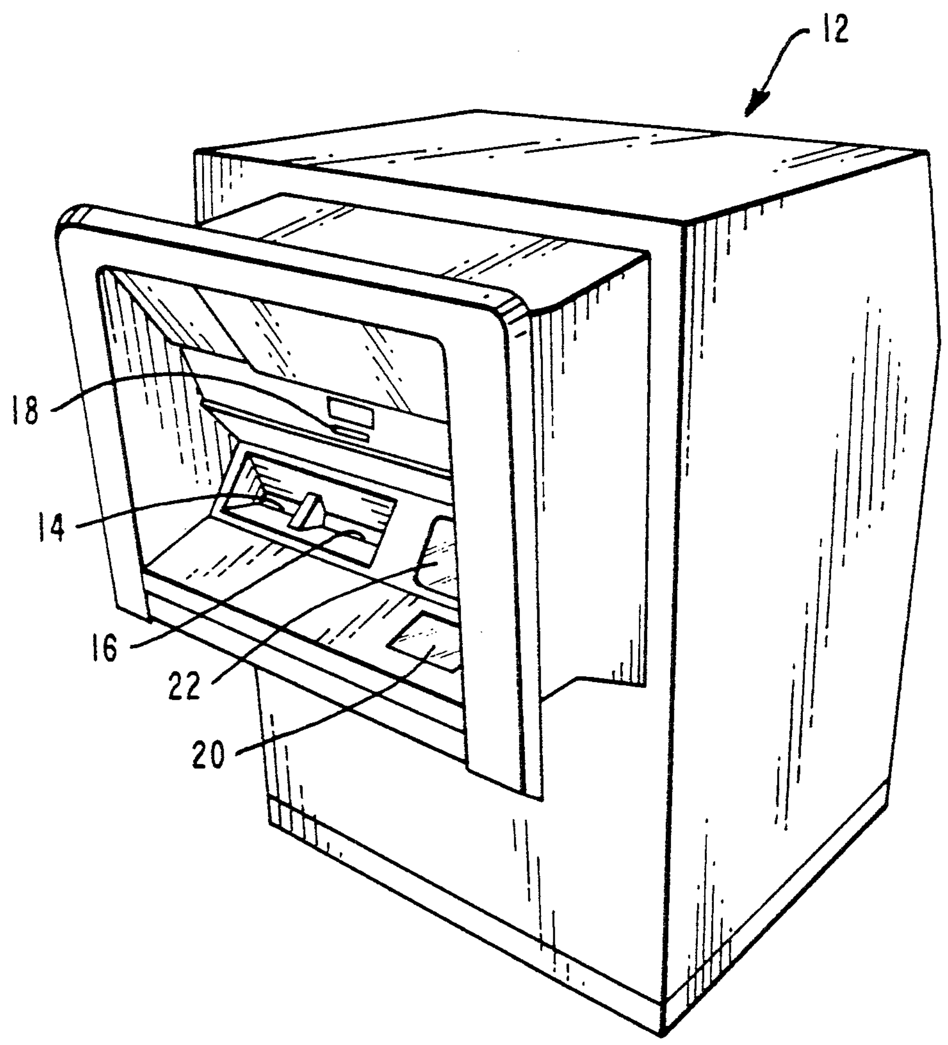
FIG. 1 is a perspective view of an ATM incorporating a depository apparatus made according to this invention.
Figure 2:
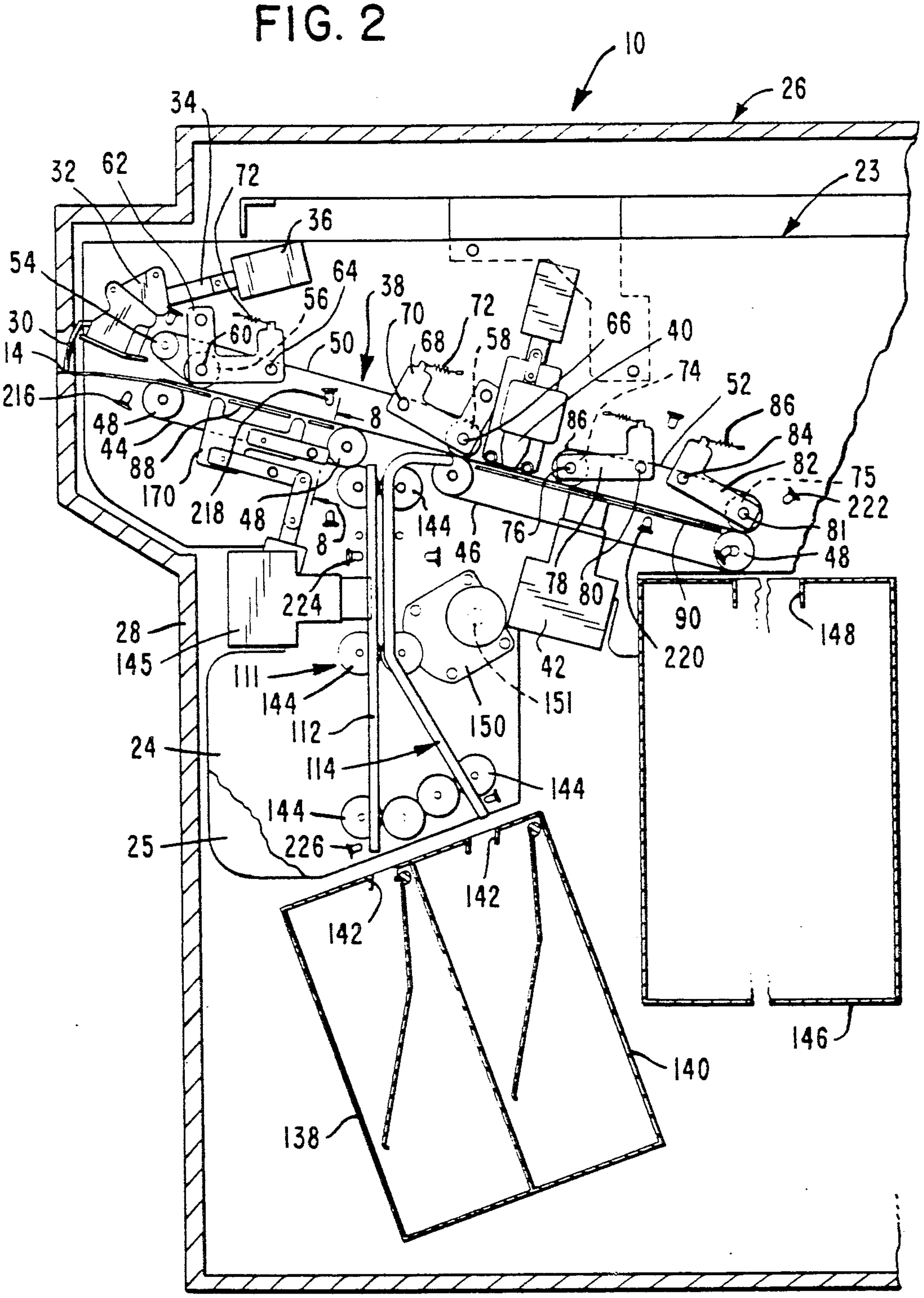
FIG. 2 is a side elevational view of the depository apparatus, with certain parts thereof omitted for the sake of clarity.

Referring to FIGS. 1 and 2, a depository 10 (FIG. 2) is incorporated in an ATM 12 adapted to accept deposit items, represented by envelopes containing money or single sheet items such as check or payment slips, through an entry slot 14, and to dispense currency notes through a slot 16. It should be noted that, in the following description, it is assumed that single sheet items handled by the depository 10 are checks. The ATM 12 also includes a card entry slot 18 through which a user of the machine inserts a customer identifying card, a keyboard 20 on which the user enters data such as type of transaction and quantity of money required or to be paid in, and a CRT screen 22 on which user instructions are displayed.

Referring now particularly to FIG. 2, the depository 10 includes a supporting framework 23, having side walls 24 and 25, mounted in a safe 26 in the front wall 28 of which is formed the entry slot 14. The entry slot 14 is normally closed by a shutter 30 which is connected by an actuating mechanism 32 to the armature 34 of a solenoid 36. Energization of the solenoid 36 serves to retract the shutter 30 from its closed position shown in FIG. 2 so as to permit deposit items to be inserted in the depository 10 through the slot 14.

Figure 8:
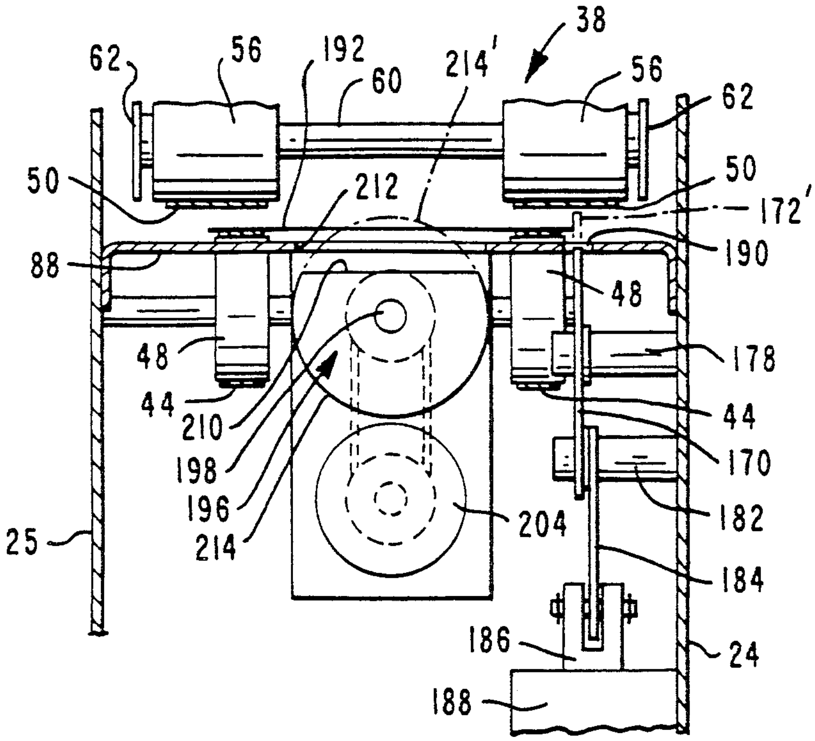
FIG. 8 is a part-sectional, rear elevational view of part of the depository apparatus, the view being taken along the line 8—8 in FIG. 2, and showing friction rolls, and a drive mechanism therefor associated with the alignment plate mechanism of FIG. 7.

Referring now also to FIG. 8, the depository 10 includes a transport mechanism 38 for transporting deposit items inwardly from the entry slot 14 past an optical read head 40 (FIG. 2) and an ink jet printer 42. The mechanism 38 includes two lower pairs of endless belts 44 and 46 which pass around pulleys 48 having fixed axes of rotation, and two upper pairs of endless belts 50 and 52, the belts 50 being mounted in co-operative relationship with respect to the belts 44 and 46 and the belts 52 being mounted in cooperative relationship with respect to the belts 46. Two of the pulleys 48 associated with the belts 44 and two of the pulleys 48 associated with the belts 46 serve as drive pulleys for driving the belts 44 and 46.

Each of the belts 50 passes around an associated pulley 54 and associated pinch rolls 56 (FIG. 2) and 58, the pulley 54 having a fixed axis of rotation and the pinch rolls 56 and 58 having movable axes of rotation. The pinch rolls 56 are rotatably mounted on a shaft 60 which is carried by and extends between, a pair of generally U-shaped support members 62 which are pivotably mounted on a shaft 64 extending between the side walls 24 and 25 of the framework 23. Similarly, the pinch rolls 58 are rotatably mounted on a shaft 66 carried by a pair of generally U-shaped support members 68 which are pivotably mounted on a shaft 70. Tension springs 72 are connected to the support members 62 and 68 as shown in FIG. 2 whereby the assembly of the support members 62 and pinch rolls 56 is biased in counterclockwise direction (with reference to FIG. 2) about the shaft 64, and the assembly of the support members 68 and pinch rolls 58 is biased in a clockwise direction about the shaft 70. By this means, the belts 50 are normally held in resilient engagement with the belts 44 and with the left hand portions of the belts 46 for the purpose of feeding a deposit item between the belts 50 and 44 and between the belts 50 and 46. Each of the belts 52 passes around associated pinch rolls 74 and 75, the pinch rolls 74 being mounted on a shaft 76 carried by a pair of generally L-shaped support members 78 pivotably mounted on a shaft 80, and the pinch rolls 75 being mounted on a shaft 81 carried by a pair of generally L-shaped support members 82 pivotably mounted on a shaft 84. Tension springs 86 serve to bias the assembly of the pinch rolls 74 and the support members 78 and the assembly of the pinch rolls 75 and the support members 82 in counterclockwise and clockwise directions, respectively, whereby the belts 52 are held in resilient engagement with the belts 46 for the purpose of feeding deposit items therebetween.

Figure 3:
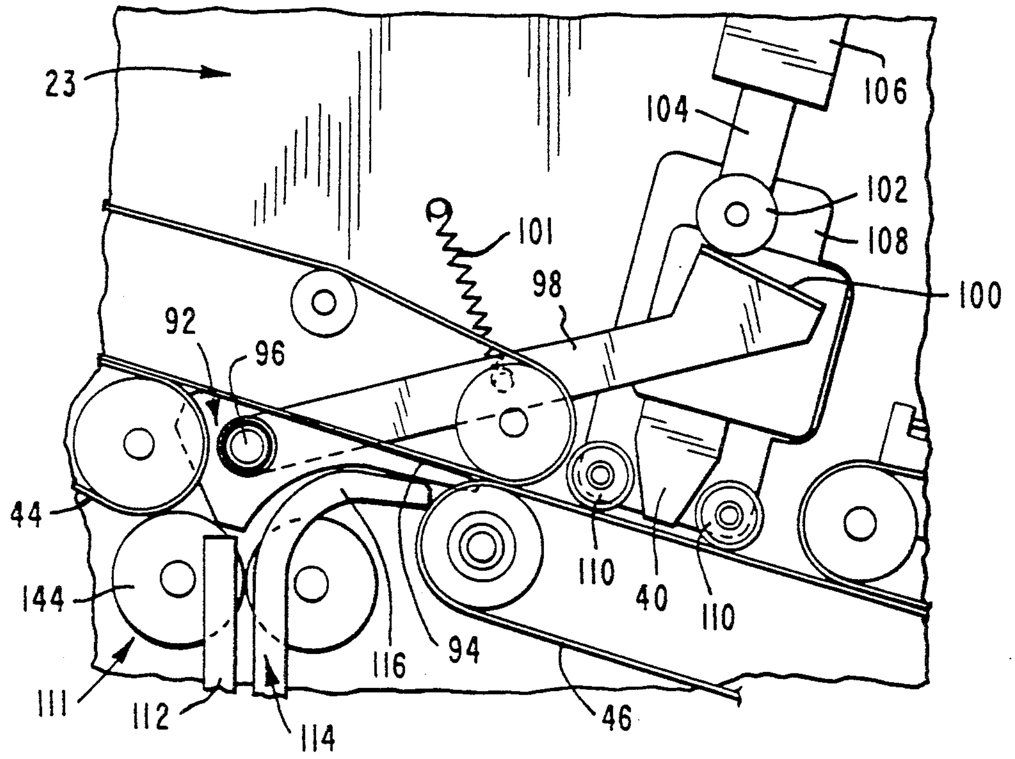
FIG. 3 is a side elevational view (similar to FIG. 2) of an upper diverter gate included in the depository apparatus, the diverter gate being shown in a closed position.
Figure 4:
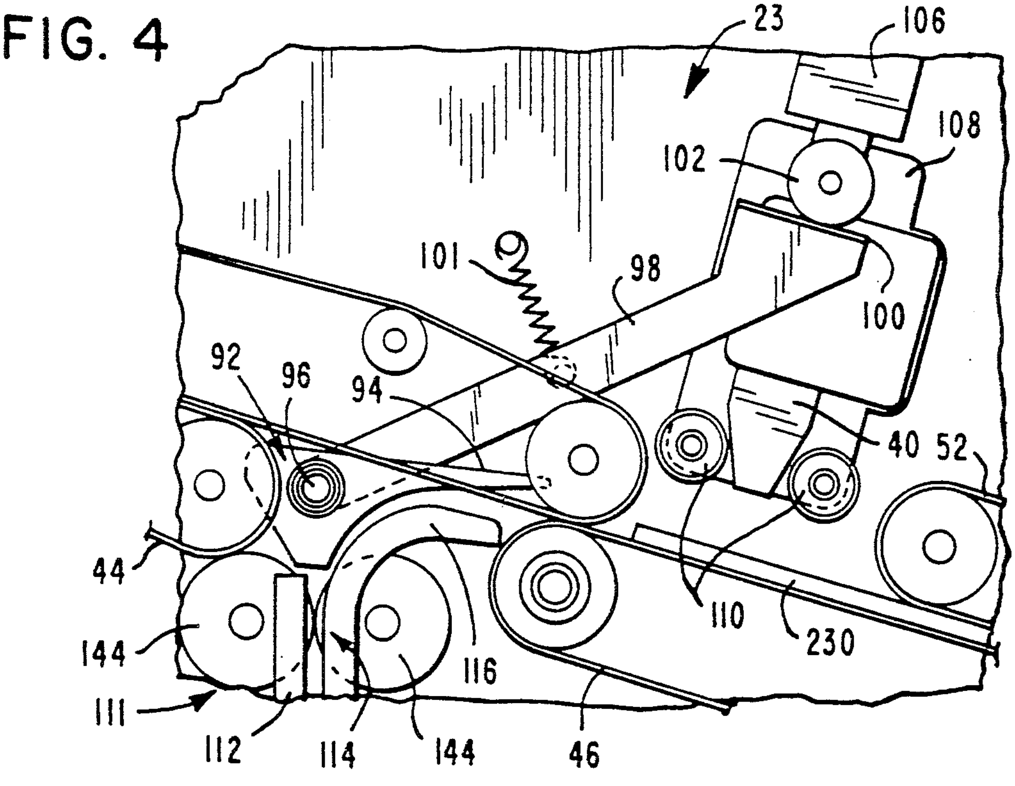
FIG. 4 is a view similar to FIG. 3 with the diverter gate being shown in an open position.

A support plate 88 (FIG. 2) extends from the lower edge of the entry slot 14 to the rightmost pulleys 48 (with reference to FIG. 2) associated with the belts 44, the plate 88 extending immediately beneath the upper portions of the belts 44. A further support plate 90 extends between the pairs of pulleys 48 associated with the belts 46, the plate 90 extending immediately beneath the upper portions of the belts 46. Referring now also to FIGS. 3 and 4, a diverter gate 92 (not shown in FIG. 2) which has a planar upper surface 94 and which is secured on a shaft 96 is positioned between the right hand ends of the belts 44 and the left hand ends of the belts 46, the shaft 96 being rotatably mounted with respect to the framework 23. Normally, the diverter gate 92 is held in the closed position shown in FIG. 3 with the surface 94 being substantially aligned with the upper portions of the belts 44 and 46. One end of an arm 98 is secured to the shaft 96. A lug 100 formed on the end of the arm 98 remote from the gate 92 is held by means of a light spring 101 in engagement with a cam roll 102 rotatably mounted on the armature 104 of a solenoid 106, the armature 104 being secured to a plate 108 on which the read head 40 is mounted. While the solenoid 106 is in a de-energized condition, a pair of rollers 110 mounted on the lower end of the plate 108 is held in rolling engagement with the upper portion of one of the belts 46 (or with a check being fed by the transport mechanism 38). It should be understood that the rollers 110 serve in operation to hold the read head 40 a predetermined distance from the upper surface of a check being read by the read head 40. Upon the solenoid 106 being energized, the assembly of the plate 108 and read head 40 is lifted away from the belts 46 to the position shown in FIG. 4. At the same time, the assembly of the diverter gate 92 and the arm 98 is caused to pivot in a counterclockwise direction (with reference to FIGS. 3 and 4) under the action of the spring 101 to the open position shown in FIG. 4, the cam roll 102 rolling along the lug 100. When the solenoid 106 is de-energized, the diverter gate 92, the plate 108 and the read head 40 are returned to the positions shown in FIG. 3 under the action of a spring (not shown) attached to the plate 108.

As will be explained in more detail later, the diverter gate 92 is arranged, when in its open position, to divert checks into a further transport mechanism 111 positioned beneath the transport mechanism 38 (FIG. 2), the mechanism 111 including two co-operating guide means 112 and 114 which extend downwardly away from the diverter gate 92. The guide means 114 includes a curved upper portion 116 (FIGS. 3 and 4) which is positioned immediately below the diverter gate 92 when the gate 92 is in the closed position.

Figure 5:
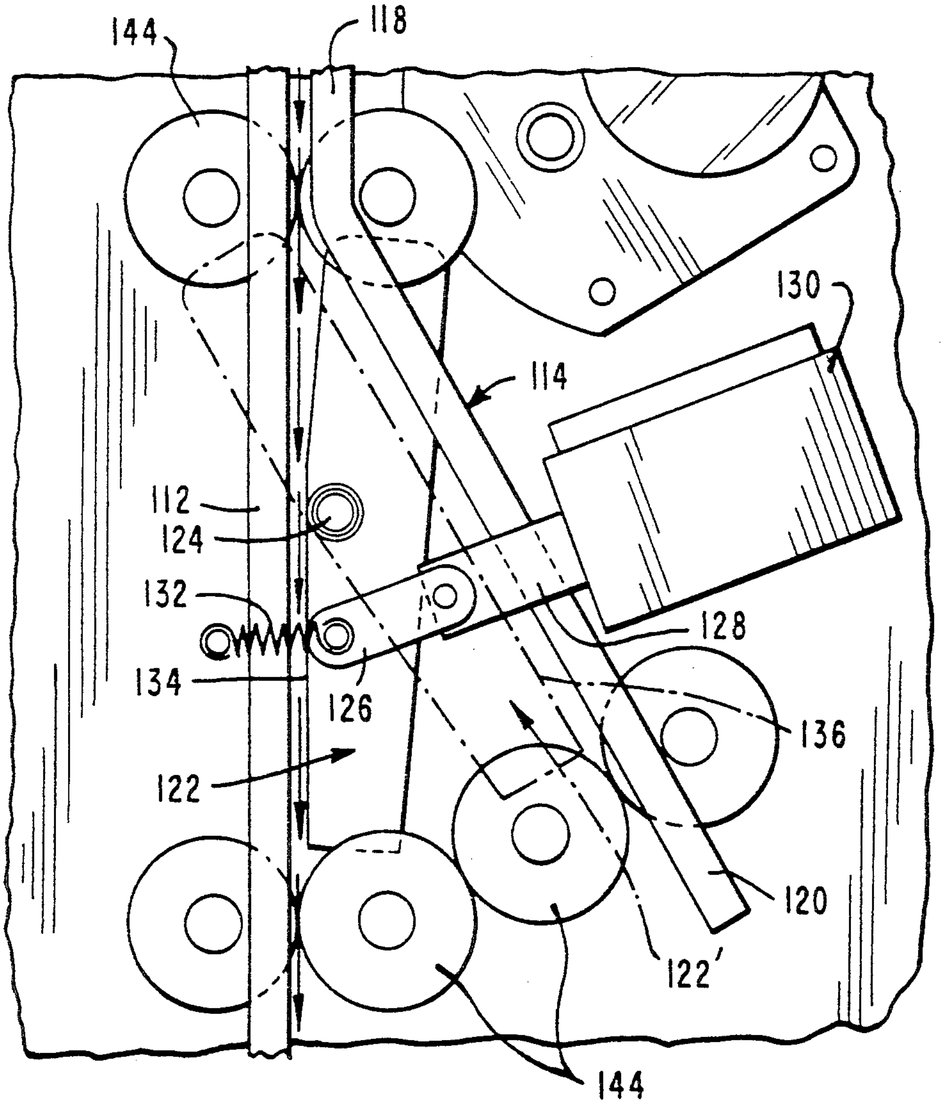
FIG. 5 is a side elevational view of a lower diverter gate included in the depository apparatus.

Referring now also to FIG. 5, the guide means 114 also includes an intermediate portion 118 extending parallel to the guide means 112, and a lower portion 120 extending at an angle away from the guide means 112. A diverter gate 122 (not shown in FIG. 2), which is pivotably mounted on a shaft 124, is associated with the portion 120 of the guide means 114 and with the adjacent portion of the guide means 112. It should be understood that each of the guide means 112 and 114 is formed as two separate parts positioned side by side, with the diverter gate 122 positioned so as to be movable between the two parts of guide means 112 and between the two parts of guide means 114. One end of a link member 126 is pivotably connected to the diverter gate 122, the other end of the link member 126 being secured to the armature 128 of a solenoid 130. With the solenoid 130 in a de-energized condition, the diverter gate 122 is held by a spring 132 in the position shown in solid outline in FIG. 5 with a left hand guide surface 134 of the diverter gate 122 extending generally parallel to the guide means 112. When the solenoid 130 is energized, the diverter gate 122 is pivoted against the action of the spring 132 into the position 122' shown in dashed outline in FIG. 5, with a right hand guide surface 136 of the diverter gate 122 extending parallel to the portion 120 of the guide means 114.

Two containers 138 and 140 (FIG. 2) are mounted inside the safe 26 beneath the guide means 112 and 114. Each of the containers 138 and 140 is provided with an opening 142 in the top thereof, the openings 142 of the two containers 138 and 140 being respectively positioned immediately beneath the lower ends of the guide means 112 and 114. Pairs of cooperating feed rollers 144 are included in the transport mechanism 111 and are associated with the guide means 112 and 114 as shown in FIGS. 2 to 5. The feed rollers 144 serve in operation to feed a check diverted into the transport mechanism 111 past a second ink jet printer 145 (FIG. 2), after which the check is fed into a selected one of the containers 138 and 140, via the respective opening 142, depending on the setting of the diverter gate 122. A further container 146 (FIG. 2) is mounted inside the safe 26 beneath the right hand end (with reference to FIG. 2) of the transport mechanism 38. In operation, the transport mechanism 38 serves to feed deposit items represented by envelopes containing money into the container 146 via an opening 148 in the top thereof.

A main drive motor 150 (FIG. 2) is mounted on the framework 23, the motor 150 serving to drive the belts 44 and 46 and the feed rollers 144 via conventional transmission means (not shown). It should be understood that the belts 50 and 52 are driven in operation by virtue of the frictional engagement of the belts 50 and 52 with the belts 44 and 46. A timing disc (not shown) is mounted on the drive shaft 151 of the motor 150. The timing disc is associated with a sensor 152 (FIG. 10) which generates a series of timing pulses when the motor 150 is in operation.

Figure 6:
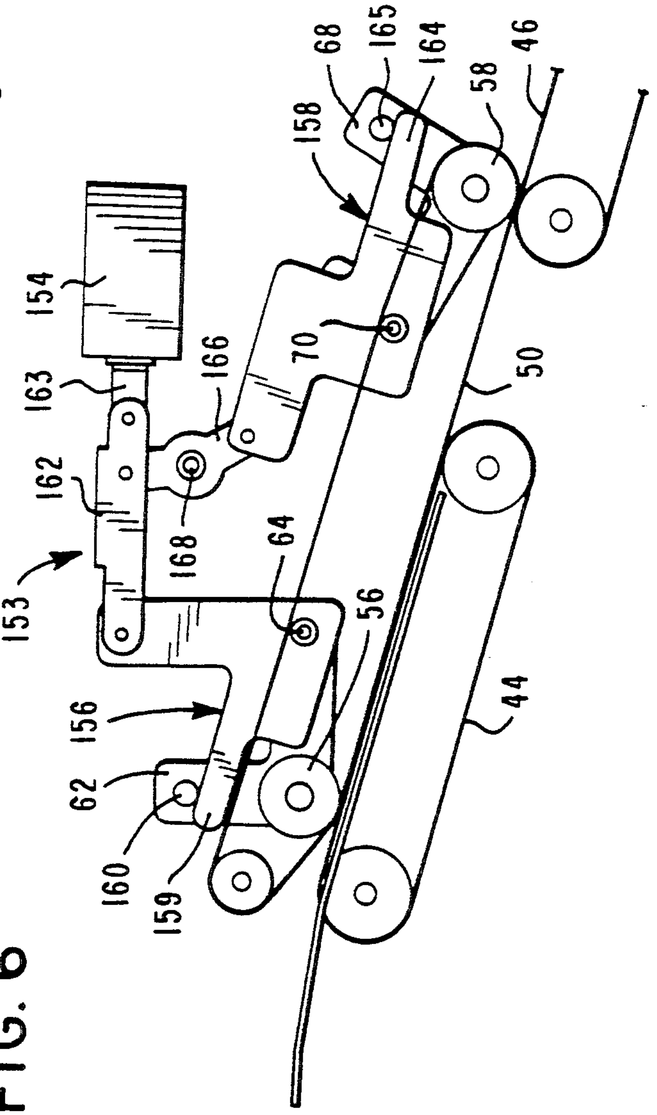
FIG. 6 is a side elevational view of a mechanism for lifting pinch rolls associated with an upper pair of feed belts of the depository apparatus away from two lower pairs of feed belts.

FIG. 6 shows a mechanism 153 (not shown in FIG. 2) for lifting the pinch rolls 56 and 58 away from the belts 44 and 46 in response to energization of an associated solenoid 154. It should be noted that, for the sake of clarity, the support members 62 and 68 nearer the side wall 25 are omitted in FIG. 6. The mechanism 153 includes two levers 156 and 158 which are respectively mounted on the shafts 64 and 70 and which are positioned between the two belts 50. The lever 156 has a projection 159 which is arranged to engage a shaft 160 extending between the two support members 62. A portion of the lever 156 remote from the projection 159 is pivotably connected to one end of a link member 162, the other end of which is secured to the armature 163 of the solenoid 154. The lever 158 has a projection 164 which is arranged to engage a shaft 165 extending between the two support members 68. A portion of the lever 158 remote from the projection 164 is pivotably connected to one end of a link member 166 which is pivotably mounted on a shaft 168 secured to the framework 23, the other end of the link member 166 being pivotably connected to the link member 162. Normally, the solenoid 154 is in a de-energized condition, and, as previously described, the belts 50 are held by the pinch rolls 56 and 58 in resilient engagement with the belts and 44 and 46 under the action of the associated springs 72 (FIG. 2). With reference to FIG. 6, upon the solenoid 154 being energized, the link member 162 and the armature 163 are moved from left to right, thereby bringing about pivotal movement in a clockwise direction of the lever 156 which in turn brings about pivotal movement in a clockwise direction of the associated support members 62 by virtue of the engagement of the projection 159 with the shaft 160. At the same time, the link member 166 is pivoted in a clockwise direction about the shaft 168, thereby bringing about pivotal movement in a counterclockwise direction of the lever 158 which in turn brings about pivotal movement in a counterclockwise direction of the associated support members 68 by virtue of the engagement of the projection 164 with the shaft 165. Thus, it will be appreciated that energization of the solenoid 154 serves to lift the pinch rolls 56 and 58 away from the belts 44 and 46 against the action of the associated springs 72 (FIG. 2). It should be understood that the belts 50 are stretchable and in a tensioned condition, so that the lifting of the pinch rolls 56 and 58 also causes the belts 50 to be lifted away from the belts 44 and 46.

Figure 7:
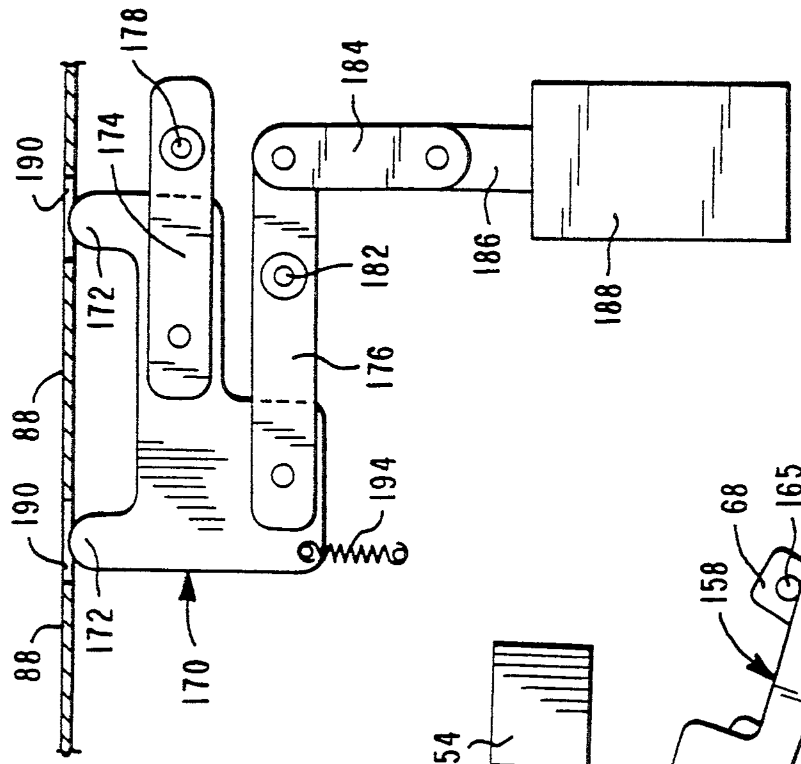
FIG. 7 is a side elevational view of an alignment plate mechanism included in the depository apparatus.

Referring to FIGS. 2, 7 and 8, there is shown therein an alignment member in the form of a plate 170 having two upwardly projecting alignment lugs 172. The plate 170 is carried by a pair of arms 174 and 176 which extends parallel to each other and corresponding ends of which are pivotably connected to the plate 170. That end of the arm 174 not connected to the plate 170 is pivotably mounted on a stud 178 secured to the side wall 24 of the framework 23, while the arm 176 is pivotably mounted on a stud 182 at a location intermediate the ends of the arm 176, the stud 182 also being secured to the walls 24. That end of the arm 176 not connected to the plate 170 is pivotably connected to one end of a link member 184, the other end of which is pivotably connected to the armature 186 of a solenoid 188. When the solenoid 188 is in a de-energized condition, the ends of the lugs 172 are respectively located in two apertures 190 formed in the support plate 88, these ends being positioned just below the upper surface of the plate 88. As seen in FIG. 8, the apertures 190 are positioned adjacent that one of the belts 44 nearer the side wall 24, with the apertures 190 being located between the wall 24 and the adjacent belt 44. When the solenoid 188 is energized, the link member 184 is moved downwardly, thereby causing the arms 174 and 176 to pivot in a clockwise direction (with reference to FIG. 7) about the studs 178 and 182. This pivotal movement of the arms 174 and 176 causes the plate 170 to be lifted so that the lugs 172 are moved to a position 172' in which they project above the support plate 88 as shown in dashed outline in FIG. 8. As will be explained later, when the lugs 172 are in the position 172', they act as an alignment surface for a check 192 (FIG. 8) which has been inserted as a deposit item in the depository 10. When the solenoid 188 is de-energized, the plate 170 is returned to the position shown in FIG. 7 under the action of a spring 194.

Figure 9:
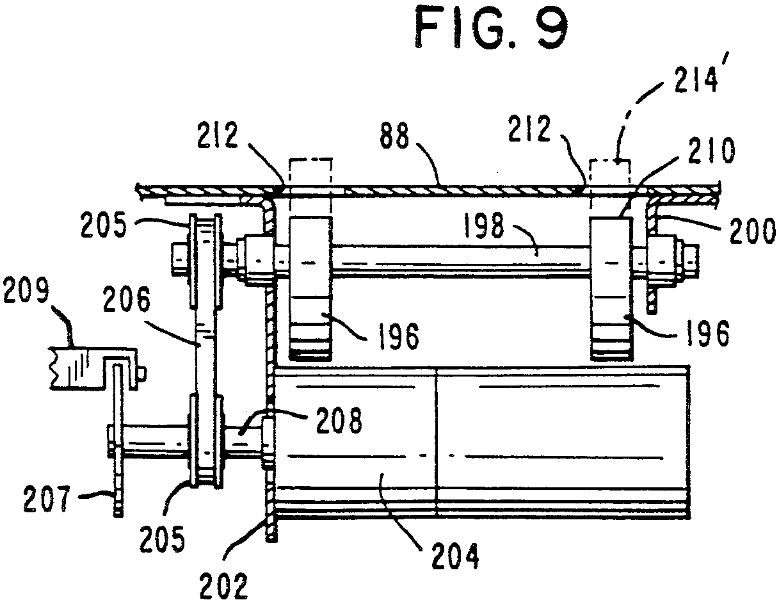
FIG. 9 is a part-sectional, side elevational view of the friction rolls and drive mechanism shown in FIG. 8.

The alignment member represented by the plate 170 is associated with a pair of friction rolls 196 as shown in FIG. 8 and 9. The rolls 196 are secured on a shaft 198 which extends between, and is rotatably mounted with respect to, a first, smaller, bracket 200 (FIG. 9) and a second, larger, bracket 202 secured to the underside of the support plate 88. An electric motor 204 is mounted on the bracket 202. The motor 204 serves to drive the shaft 198 via pulleys 205 and a belt 206, one of the pulleys 205 being secured on a portion of the shaft 198 projecting beyond the bracket 202. The timing disc 207 (FIG. 9) is mounted on the drive shaft 208 of the motor 204. The timing disc 207 is associated with a sensor 209 which in operation generates an output pulse for each revolution of the friction rolls 196. The friction rolls 196 have a D-shaped profile, and, normally, with the motor 204 is a non-operated condition, the flat portion 210 of the periphery of each roll 196 is positioned beneath, and parallel to, the underside of the support plate 88, as shown in FIGS. 8 and 9. The rolls 196 are respectively associated with two apertures 212 formed in the support plate 88, so that, when the rolls 196 are rotated from their normal positions by operation of the motor 204, the curved portions 214 of the peripheries of the rolls 196 can project above the upper surface of the plate 88 as indicated by the portion 214' shown in dashed outline in FIGS. 8 and 9. It should be understood that, if a check 192 is positioned on the belts 44 above the friction rolls 196 at the time the motor 204 is operated, and with the solenoid 188 in an energized condition, the check 192 is lifted and carried by the rolls 196 from left to right with reference to FIG. 8, i.e. in a direction transverse to the feed path for the check 192, so as to cause one of the long edges of the check 192 to engage the lugs 172 which are in the lifted position 172'. When the check 192 is positioned, as just described, with a long edge in engagement with the lugs 172, the check 192 is correctly aligned with the read head 40 and printer 42 (FIG. 2) so that proper reading and writing operations can take place with respect to the check 192.

Referring again to FIG. 2, a deposit item thickness sensor means 216 is positioned between the shutter activating mechanism 32 and the pinch rolls 56. The sensor means 216 is of known construction and produces an output indicative of whether a deposit item inserted in the depository apparatus 10 is a check or an envelope, on the basis of the amount of light which is transmitted through the deposit item from a light transmitter to a light receiver incorporated in the sensor means 216. Further optical sensor means 218, 220 and 222 are positioned along the feed path of the transport mechanism 38, the sensor means 218 being positioned between the alignment plate 170 and the right hand pulleys 48, the sensor means 220 being centrally positioned with respect to the two pairs of pinch rolls 74 and 75, and the sensor means 222 being positioned at the right hand end of the transport mechanism 38. The sensor means 218 senses the leading edge of an envelope or check, and the sensor means 220 senses the leading edge of a check, for a purpose which will be described later. The sensor means 222 provides an indication of when the container 146 for envelopes is full by sensing when an envelope fails to drop from the transport mechanism 38 into the container 146. Two more optical sensor means 224 and 226 are associated with the transport mechanism 111. The sensor means 224 is positioned between the uppermost feed rollers 144 and the printer 145, for a purpose which will be described later. The sensor means 226 is positioned adjacent the lower ends of the guide means 112 and 114, and provides an indication of when one of the containers 138 and 140 is full by sensing when a check fails to drop from the transport mechanism 111 into the container 138 or 140.

Figure 10:
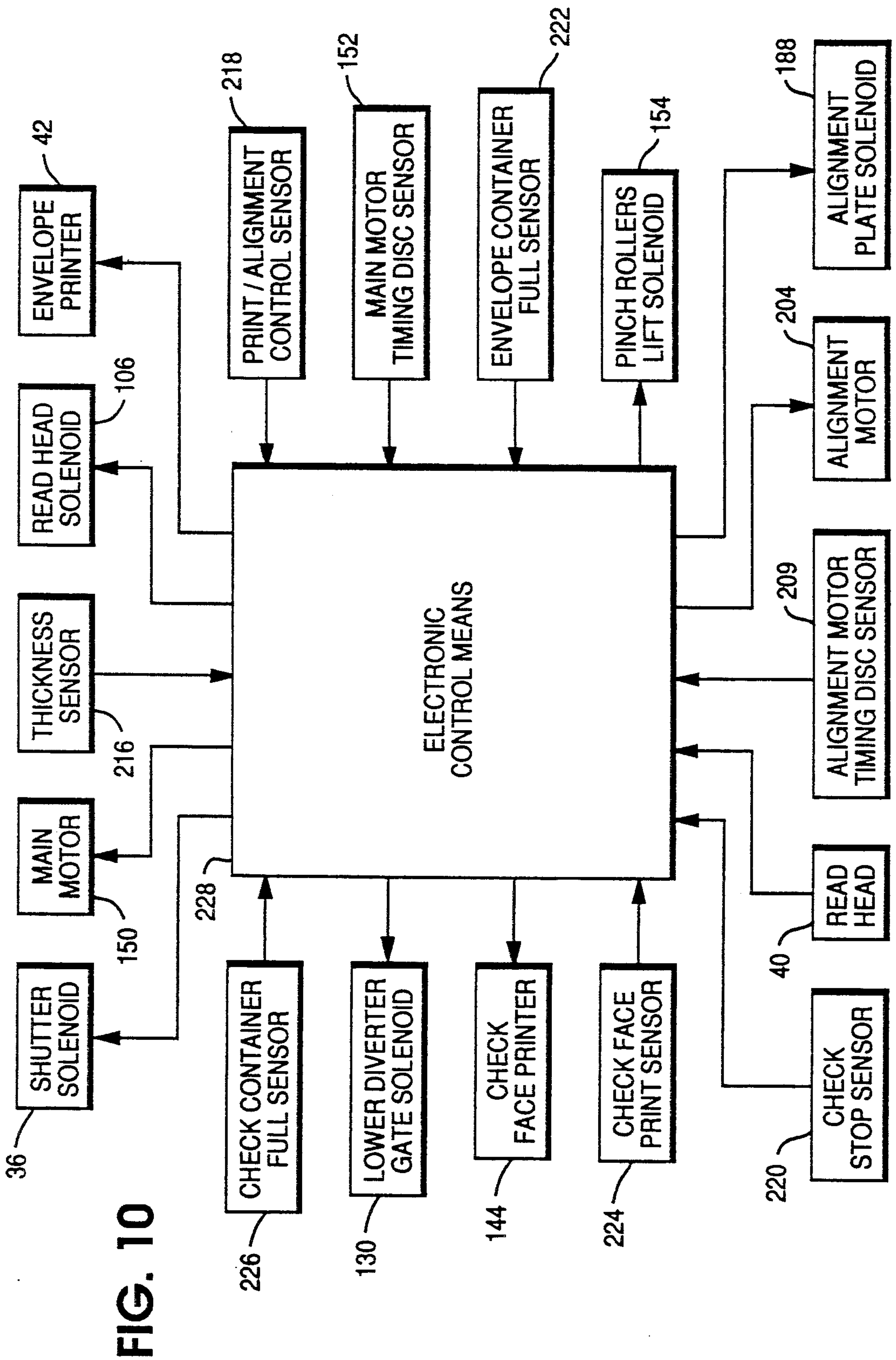
FIG. 10 is a schematic block diagram illustrating the electrical interconnection of parts of the depository apparatus.

The operation of the depository 10 will now be described with additional reference to FIG. 10. In response to a customer requesting a deposit transaction by entering appropriate data on the keyboard 20, an electronic control means 228 included in the ATM 12 energizes the solenoid 36 (FIG. 2) so as to cause the shutter 30 to be opened, and causes the main motor 150 to commerce operation. It should be understood that, at the commencement of operation of the main motor 150, the other solenoids 106, 130, 154 and 188 are all in de-energized conditions, and the motor 204 (FIG. 8) associated with the friction rolls 196 is in a non-operated condition. The customer then inserts a deposit item, which may be an envelope containing money or a check, through the entry slot 14 until the leading edge of the deposit item reaches the nip of the feed belts 44 and 50, whereupon the deposit item is gripped by the belts 44 and 50 and is fed therebetween away from the entry slot 14, from left to right with reference to FIG. 2. If the item to be deposited is a check, the customer inserts the check into the entry slot 14 with the face of the check uppermost, with a short edge leading and with the lower edge of the check to the right (with reference to FIG. 1). Prior to the deposit item reaching the nip of the belts 44 and 50, the thickness sensor means 216 applies a signal to the electronic control means 228 indicative of whether the deposit item is an envelope or a check.

If the thickness sensor 216 indicates that the deposit item is an envelope, the solenoid 154 (FIG. 6) remains in a de-energized condition so that first the belts 44 and 50, then the belts 46 and 50, and finally the belts 46 and 52 feed the envelope in a non-interrupted manner away from the entry slot 14 and into the container 146. It should be understood that the resilient mounting of the pinch rolls 56, 58, 74 and 75 makes it possible for envelopes containing money up to 1.25 centimeters in thickness to be accommodated between the belts 44 and 50, 46 and 50 and 46 and 52. The indication by the thickness sensor 216 that the deposit item is an envelope causes the electronic control means 228 to energize the read head solenoid 106 (FIG. 3) so as to cause the read head 40 to be lifted away from the belts 46 to the position shown in FIG. 4, thereby enabling the envelope to pass freely beneath the print head 40 as can be seen with regard to the envelope 230 shown in FIG. 4. At the same time, as the read head 40 is lifted away from the belts 46, the assembly of the diverter gate 92 and arm 98 is pivoted in a counterclockwise direction to the position shown in FIG. 4 under the action of the spring 101. However, because the spring 101 is only a light spring, when the envelope reaches the diverter gate 92, the envelope pushes the diverter gate 92 back to its closed position shown in FIG. 3 so that the envelope passes over the diverter gate 92 and into the nip of the belts 46 and 50. While the envelope 230 (FIG. 4) is passing over the printer 42 while being fed between the belts 46 and 52, the electronic control means 228 causes the printer 42 to print a summary of the transaction, e.g. date, time, and amount of money contained in the envelope (as entered by the customer on the keyboard 20) on the underside of the envelope. The sensing means 218 applies a pulse to the electronic control means 228 in response to the sensing of the leading edge of the envelope, and thereafter the electronic control means 228 commences a count of the timing pulses applied thereto by the main motor timing disc sensor 152, the electronic control means 228 causing the printer 42 to commerce operation when this count reaches a predetermined number.

As previously mentioned, the envelope container full sensor means 222 is mounted adjacent the right hand end (with reference to FIG. 2) of the transport mechanism 38. In response to the sending of a CONTAINER FULL signal to the electronic control means 228 by the sensor means 222, the electronic control means 228 provides an indication that the container 146 is full, and shuts down the operation of the depository 10 until such time as the container 146 is emptied. If the container 146 is not full, then following the deposit of the envelope in the container 146, the electronic control means 228 returns the depository 10 to its quiescent condition, in which it is ready for the acceptance of a further deposit item, by stopping the operation of the main motor 150 and de-energizing the shutter solenoid 36 and the read head solenoid 106. Following the de-energization of the solenoids 36 and 106, the shutter 30 is returned to its closed position by spring means (not shown) and the read head 40 and the diverter gate 92 are returned to the positions shown in FIG. 3 by spring means (not shown).

If the thickness sensor 216 indicates that the deposit item is a check, the electronic control means 228 stops the operation of the main motor 150 in response to the sensing of the leading edge of the check by the sensor means 218, the check at this time being positioned above the friction rolls 196 (FIGS. 8 and 9). The electronic control means 228 then energizes the solenoid 154 (FIG. 6) so as to cause the pinch rolls 56 and 58 and the belts 50 to be lifted away from the belts 44, and energizes the solenoid 188 (FIG. 7) so as to lift the alignment plate 170 to the position in which the lugs 172 project above the upper surface of the support plate 88. The electronic control means 228 then initiates operation of the alignment motor 204 (FIGS. 8 and 9) so as to cause the friction rolls 196 to move the check into a correctly aligned position as previously described, in which a long edge of the check abuts against the raised lugs 172' as shown for the check 192 in FIG. 8. After a number of complete revolutions of the drive shaft 208 of the motor 204, the electronic control means 228 stops the operation of the motor 204 after a predetermined number of pulses have been applied to the electronic control means 228 by the sensor 209 (FIG. 9). The friction rolls 196 are now again positioned in their home positions with the flat portions 210 of their peripheries positioned immediately below, and parallel to, the underside of the support surface 88. It should be understood that the lifting of the pinch rolls 56 and 58 and the belts 50 away from the belts 44 ensures that the belts 50 are held clear of the check while the alignment operation in respect of the check is completed.

After the check has been correctly aligned as just described, the electronic control means 228 de-energizes the solenoid 154 (FIG. 6), thereby bringing the belts 50 back into co-operative engagement with the belts 44, and restarts the operation of the main drive motor 150 so as to cause the transport mechanism 38 to resume feeding the check away from the entry slot 14 and towards the end of the transport mechanism 38 adjacent the container 146. At this time the solenoid 106 (FIG. 3) remains in a de-energized condition, so that the diverter gate 92 is in its closed position as shown in FIG. 3, and the rolls 110 associated with the read head 40 are in rolling engagement with the upper portions of the belts 46. During this further feeding movement, the check passes under the optical read head 40 and over the printer 42. While the check is passing under the read head 40, with the rolls 110 holding the lower end of the read head 40 at the correct distance away from the face of the check for proper reading, the read head 40 reads a pre-printed code line of optical E13B characters on the check and applies signals representing these characters to the electronic control means 228. On the basis of the signals applied to it by the read head 40, the electronic control means 228 determines whether a valid read operation has taken place, that is to say whether a valid series of E13B characters has been read.

Feeding movement of the check continues until the leading edge of the check is sensed by the sensor means 220. In response to the sensing of the leading edge by the sensor means 220 and in response to timing pulses applied to the electronic control means 228 by the main motor timing disc sensor 152, the electronic control means 228 stops the operation of the main motor 150 with the trailing edge of the check positioned adjacent the printer 42 (FIG. 2). If the electronic control means 228 determines that an invalid read operation has taken place, due, for example, to the customer having inserted the check face downwards through the entry slot 14 or with the left hand edge of the check leading, then the electronic control means 228 causes the main motor 150 to operate in the reverse sense, with the diverter gate 92 remaining in its closed position, so as to feed the check back to the customer. The customer now has the opportunity to re-insert the check in the entry slot 14 with the correct orientation. If the electronic control means 228 determines that a valid read operation has taken place, then the electronic control means 228 again causes the main motor 150 to operate in the reverse sense, but this time the electronic control means 228 energizes the solenoid 106 so as to cause the diverter gate 92 to be pivotted into its open position as shown in FIG. 4. Thus, the check is diverted by the diverter gate 92 into the transport mechanism 111, between the upper ends of the guide means 112 and 114, for feeding movement by the feed rollers 144. During the movement of the check back towards the diverter gate 92, the electronic control means 228 causes the printer 42 to print reconciliation data, e.g. date and time of day, on the underside of the check.

After the check has been diverted into the transport mechanism 111, the leading edge of the check is sensed by the sensor means 224 (FIG. 2). In response to the sensing of the leading edge by the sensor means 224 and in response to timing pulses applied to the electronic control means 228 by the main motor timing disc sensor 152, the electronic control means 228 causes the printer 145 to print on the face of the check further data such as the amount of the check as entered by the customer on the keyboard 20. Prior to the check in the transport mechanism 111 reaching the lower diverter gate 122 (FIG. 5), the electronic control means 228 makes a determination as regards to which of the two containers 138 and 140 the check is to be fed. This determination is made on the basis of some of the characters, e.g. bank branch identifying number, read by the optical read head 40. If the electronic control means 228 determines that the check is to be fed into the container 138, then the solenoid 130 (FIG. 5) remains de-energized and the check is fed by the appropriate feed rollers 144 between the guide means 112 and the left hand guide surface 134 of the diverter gate 122 into the container 138 via the respective opening 142. If the electronic control means 228 determines that the check is to be fed into the container 140, then the electronic control means 228 energizes the solenoid 130 so as to cause the diverter gate 122 to be pivotted into the position 122' shown in dashed outline in FIG. 5. The check is then fed by the appropriate feed rollers 144 between the right hand guide surface 136 of the diverter gate 122 and the lower portion 120 of the guide means 114 into the container 140 via the respective opening 142.

As previously mentioned, the sensor means 226 for detecting when one or the other of the containers 138 and 140 is full is positioned adjacent the lower ends of the guide means 112 and 114. In response to the sending of a CONTAINER FULL signal to the electronic control means 228 by the sensor means 226, the electronic control means 228 provides an indication that one of the containers 138 and 140 is full and shuts down the operation of the depository 10 until such time as the full container 138 or 140 is emptied. If neither of the containers 138 and 140 is full, then following the deposit of the check in the appropriate container 138 or 140, the electronic control means 228 restores the depository 10 to its quiescent condition, in which it is ready for the acceptance of a further deposit item, by stopping the operation of the main motor 150 and de-energizing the solenoids 36, 106, 130 (if the container 140 had been selected) and 188. Following the de-energization of the solenoid 188, the alignment plate 170 is returned to its home position shown in FIG. 7.

The depository apparatus described above has the advantage that the provision of a common transport mechanism 38 for feeding both envelopes and checks past the read head 40 and printer 42 simplifies the construction of the apparatus. Also, the use of such common transport mechanism 38 leaves space for the provision of the separate transport mechanism 111 for feeding checks past a further printer 145 and into a selected one of two containers 138 and 140 for checks. The provision of two printers 42 and 145 for printing on both sides of checks assists in reconciliation procedures for the checks. Moreover, the provision of two, individually selectable, containers 138 and 140 for checks, and a separate container 146 for envelopes, assists in the handling of deposit items after they are removed from the depository 10.

What is claimed is:

1. A depository apparatus for receiving a deposit item which is an envelope or a sheet, comprising:
- a housing having an entry aperture therein;
- a thickness sensing means for providing an output indicative of whether said deposit item is an envelope or a sheet;
- print means for printing data on said deposit items;
- read means for reading data from deposit items which are sheets;
- transport means including a common feed path for transporting deposit items from said entry aperture along said common feed path in a forward direction to said print means and said read means which are positioned in operative relationship to said common feed path;
- sheet alignment means located in operative relationship with said common feed path and said read means to align deposit items which are sheets in reading relationship with said read means, said sheet alignment means including a retractable reference member which is parallel to said forward direction;
- control means responsive to said output from said thickness sensing means for controlling the operation of said transport means and said alignment means to interrupt the operation of said transport means to enable said alignment means to align said deposit item which is a sheet against said reference member prior to said sheet reaching said read means.

2. A depository apparatus according to claim 1, in which said apparatus also includes moving means for moving said read means between a first position in which said read means is operable to read data from a deposit item which is a sheet and a second position spaced from said feed path to permit the passage of a deposit item which is an envelope past said read means, and in which said read means is arranged to be moved to said second position in response to the sensing by sensing means of the entry of an envelope into said entry aperture.

3. A depository apparatus according to claim 2, in which said read means includes roller means arranged to be in rolling contact with a deposit item during the reading of data from this item.

4. A depository apparatus according to claim 1 in which said depository apparatus also includes:
- first collecting means for collecting envelopes;
- second collecting means for collecting sheets; and
- diverter means located in said common feed path and settable to a first position or a second position in response to an output of said thickness sensing means;
- said control means in response to said output from said thickness sensing means being effective to control operation of said transport means such that, if a deposit item is an envelope, this envelope is transported by said transport means to said first collecting means, and such that, if a deposit item is a sheet, the operation of said transport means is reversed so as to drive this sheet back along said common feed path to said diverter means from where this sheet is fed back to said entry aperture if said diverter means is in said first position, or is diverted from said common feed path to said second collection means if said diverter means is in said second position.

5. A depository apparatus according to claim 4 in which said second collection means includes a first container and a second container, and in which said depository apparatus also includes a second diverter means settable to a first position or to a second position in response to the output of the read means and said control means to enable a deposit item diverted towards said second collection means to be fed to said first container if said second diverter means is set to its said first position, and to be fed to said second container if said second diverter means is set to its said second position.

6. A depository apparatus according to claim 4 in which said depository apparatus also includes a second print means arranged to print data on a surface of a deposit item diverted from said common feed path towards said second collection means when said diverter means is in said second position; said surface being opposite the surface of this deposit item on which data is printed by the said print means positioned in said common feed path.

7. A depository apparatus according to claim 1 in which said transport means comprises:
- first feed means and second feed means forming a part of said common feed path for feeding said deposit item; and actuation means for moving said second feed means away from said first feed means in response to the output from said thickness sensing means;

said first and second feed means being arranged in cooperative relationship with each other to enable said deposit item to be gripped therebetween and fed thereby; and said actuation means being controlled by said control means to enable said second feed means to be moved away from said first feed means prior to operation of said sheet alignment means when the output from said thickness sensing means indicates that said deposit item is a sheet.

8. A depository apparatus according to claim 7, in which said alignment means is arranged to move said sheet into engagement with said reference member in a direction transverse to said common feed path after said second feed means is moved away from said first feed means by said actuation means.

9. A depository apparatus according to claim 8 in which said alignment means is formed by rotatably mounted friction rollers arranged to rotate under the control of said control means;

said friction rollers having a "D"-shaped profile such that, during part only of one revolution of said friction rollers said friction rollers engage said sheet for the purpose of moving the sheet into engagement with said reference member.

10. A depository apparatus according to claim 7 in which said first feed means is positioned below said second feed means, and in which said reference member is formed by a plate movable, under the control of said control means, between first and second positions in which said plate projects and does not project, respectively, above said first feed means; said plate being arranged to project above said first feed means during operation of said sheet alignment means when said output from said thickness sensing means indicates that said deposit item is a sheet.

11. A depository apparatus for receiving a deposit item which is an envelope or a sheet, comprising:

a housing having an entry aperture therein;

a common transport for receiving said deposit item from said entry aperture, and drive means for moving said common transport in first and second opposed directions;

a sheet transport;

a diverter located in said common transport and moveable between non-diverting and diverting positions relative to said common transport to divert said sheet to said sheet transport when said diverter is in said diverting position;

a thickness sensor positioned between said entry aperture and said diverter for providing an output indicative of whether a deposit item is an envelope or a sheet;

a sheet aligner positioned between said thickness sensor and said diverter and having a reference member which is moved into an operative position relative to said sheet against which said sheet is aligned only when the deposit item is a sheet;

a printer located along said common transport on a side of said diverter which is away from said entry opening;

a reader having a read head positioned between said printer and said diverter, with said reader having means for moving said read head between an operative position and an inoperative position relative to said common transport with regard to reading a sheet on said common transport; and control means responsive to said output from said thickness sensing means for controlling the operation of said transport means and said alignment means to interrupt the operation of said drive means of said common transport to enable said alignment means to align said sheet against said reference member prior to said sheet reaching said reader.

* * * * *